United States Patent
Haydock et al.

[19]

[11] Patent Number: 5,775,318
[45] Date of Patent: Jul. 7, 1998

[54] FORCED AIR CONDENSING FURNACE AND HEAT EXCHANGER MANIFOLD THEREFOR

[75] Inventors: Paul M. Haydock, Zionsville; Gerald K. Gable, Carmel, both of Ind.

[73] Assignee: Consolidated Industries Corp., Lafayette, Ind.

[21] Appl. No.: 558,593

[22] Filed: Oct. 30, 1995

[51] Int. Cl.$^6$ ............................................. F24H 3/02
[52] U.S. Cl. ............... 126/110 R; 126/119; 126/116 R; 126/99 R
[58] Field of Search ............... 126/110 R, 119, 126/116 R, 99 R

[56] References Cited

U.S. PATENT DOCUMENTS

| | | |
|---|---|---|
| 4,515,145 | 5/1985 | Tallman et al. |
| 4,653,466 | 3/1987 | DeHaan et al. |
| 4,738,307 | 4/1988 | Bentley. |
| 4,807,588 | 2/1989 | Bentley et al. |
| 4,848,314 | 7/1989 | Bentley. |
| 4,877,014 | 10/1989 | Beasley. |
| 4,960,102 | 10/1990 | Shellenberger ............ 126/110 R |
| 5,024,595 | 6/1991 | Scumacher et al. |
| 5,178,124 | 1/1993 | Lu et al. ............ 126/110 R |
| 5,244,381 | 9/1993 | Cahlik. |
| 5,282,456 | 2/1994 | Smelcer et al. |
| 5,301,654 | 4/1994 | Weber, III et al. |
| 5,368,010 | 11/1994 | Weber, III et al. |
| 5,408,986 | 4/1995 | Bigham. |

*Primary Examiner*—Larry Jones
*Attorney, Agent, or Firm*—Victor E. Libert; Roger C. Phillips

[57] ABSTRACT

A heat exchanger manifold (44) is provided which includes a plurality of manifold inlet openings (58) including sealant means such as grommet means (62) which receive the tube outlets (40c) of the condensing section (34) of a heat exchanger (28). The heat exchanger manifold (44) is made of a corrosion-resistant material such as a polymer such as one sold under the trademark LEXAN™ and the grommets (62) are preferably made of a resilient, corrosionresistant polymer such as rubber, e.g., a nitrile rubber. The condensing tubes (38a, 38b, 38c) are slanted to facilitate drainage of the condensate into the heat exchanger manifold (44) and a flue gas outlet (64) and a condensate drain (49) are provided to discharge, respectively, flue gas and condensate from the heat exchanger manifold (44). The condensing tubes (38a, 38b, 38c) are connected to the primary heating section (30) of the heat exchanger (28) through swaged joints (37).

25 Claims, 8 Drawing Sheets

FORCED AIR CONDENSING FURNACE AND HEAT EXCHANGER MANIFOLD THEREFOR

BACKGROUND OF THE INVENTION

1. Field Of The Invention

The present invention relates generally to forced air furnaces, and more particularly to heat exchanger manifolds for such furnaces and to forced air furnaces including such heat exchanger manifolds.

2. Description Of Related Art

U.S. Pat. No. 4,653,466, issued Mar. 31, 1987 to R. DeHaan et al for "Apparatus And Method For Removing Recuperative Condensate", discloses a furnace having a recuperative heat exchanger, i.e., a condensing furnace in which a condensate is formed as the combustion by-products cool within the furnace heat exchanger. As is well-known in the art, such condensing or recuperative furnaces increase the efficiency of the furnace by recovering the latent heat of vaporization of the condensate. An increase of several percentage points in overall thermal efficiency of a furnace may be attained by utilizing a condensing heat exchanger. However, the resultant condensate is corrosive as it is mildly acidic because of combustion by-products dissolved in the condensate.

The DeHaan et al Patent provides a condensing ("recuperative") heat exchanger 16 (column 4, lines 1–5 and FIG. 2) comprised of tubes 38 and discloses (column 5, line 20 et seq) that the tubes 38 may be sloped downwardly towards respective manifolds 20 and 22 so as to accelerate the drainage of condensate. Further, the manifolds 20 and 22 themselves may be attached with a downward slope towards the front of the furnace so that the condensate will rapidly drain towards outlet lines 58 and 60 then via an elbow 66 which is connected to a trap 64. The trap 64 merely comprises a U-shaped portion of the outlet tube which is at an elevation below the outlet elbow 66 in order to provide a liquid seal to prevent escape of flue gas products. The DeHaan et al Patent recognizes the corrosive nature of the condensate and employs the foregoing construction to quickly drain it, and further teaches (column 5, line 19 et seq), that manifolds 20 and 22 and the tubes of recuperator 16 are to be fabricated of stainless steel "to resist corrosion by the mildly acidic condensate. Furthermore, at the end of each heating cycle, fresh water is flushed through the manifolds and out the drain to wash away residual condensate." (At column 5, line 19, DeHaan et al refers to "tubes 28" but that seems to be an error as tubes 38 of recuperator 16 appears to be intended.)

U.S. Pat. No. 4,738,307, issued Apr. 19, 1988 to R.M. Bentley For "Heat Exchanger For Condensing Furnace", discloses a corrosion-resistant condensing heat exchanger for a condensing furnace. As shown in FIGS. 2, 3 and 4 and disclosed at line 28 et seq, the sheet metal blank 72 from which the condensing heat exchanger is formed has formed on the interior thereof a thin layer, 5 to 15 mils thick, of corrosion-resistant material, such as a polymer laminated sheet stock 92. This sheet stock is adhesively bonded to the metal blank 72 which is then stamped and folded to form the condensing heat exchanger cell 52 as illustrated in FIG. 2. A plurality of these cells is assembled to form the condensing heat exchanger. The Bentley Patent thereby discloses a method for protecting the heat exchanger itself from corrosion which consists of lining the entire interior surface of the heat exchanger with a corrosion-resistant polymer material.

SUMMARY OF THE INVENTION

In accordance with the present invention there is provided an improvement in a forced air furnace which includes (a) a burner assembly, (b) a housing defining a heat exchange chamber, and (c) a condensing heat exchanger disposed within the heat exchange chamber and having (i) an exchanger inlet positioned to receive hot combustion product gases from the burner assembly and (ii) a condensing section of the heat exchanger. The condensing section comprises one or more tubes terminating in one or more condensing tube outlets positioned to cause condensate to drain therefrom. The other components of the furnace are (d) a primary blower means to force air over the heat exchanger to be heated thereby, and (e) flue gas vent means connected in gas flow communication with the condensing tube outlets. The improvement comprises that: the condensing tube outlets are connected in flow communication with a heat exchanger manifold having (1) condensate-receiving surfaces made of a corrosion-resistant material, for example, made of a first polymer, (2) a flue gas outlet, (3) a condensate outlet, (4) one or more manifold inlet openings within which the condensing tube outlets are received, and (5) sealant means, for example, sealant means comprised of a second polymer, carried in the manifold inlet openings to seal the condensing tube outlets in gas-tight relation to the heat exchanger manifold.

In accordance with one aspect of the invention the heat exchanger manifold is comprised of a body defining an enclosure and the body is made of the first polymer.

Another embodiment of the invention provides for the first polymer to be different from the second polymer. For example, the first polymer may comprise a thermoplastic polycarbonate and, for another example, the second polymer may comprise a rubber such as a nitrile rubber.

In accordance with another aspect of the present invention the furnace is further comprised of a bulkhead, which optionally may define at least a portion of the heat exchange chamber, the bulkhead having one or more tube openings therein and on which the heat exchanger manifold is mounted with the one or more manifold inlet openings thereof aligned with the one or more tube openings to admit the condensing tube outlets through the tube openings thence into the manifold inlet openings.

In accordance with one aspect of the present invention there is provided a heat exchanger manifold for a forced air condensing furnace having a heat exchanger comprising a condensing section comprised of one or more tubes terminating in one or more condensing tube outlets, and the heat exchanger manifold comprising the following 5 components including a tube sheet and a manifold cover which cooperate to define therebetween an enclosure to receive flue gas and condensate from the furnace. The tube sheet and the manifold cover are each made of a corrosion-resistant polymer and the tube sheet has one or more, e.g., a plurality of, manifold inlet openings formed therein to receive such condensing tube outlets. Seating means are formed about the manifold inlet openings to seat thereon sealant means to seal such condensing tubes received in the manifold inlet openings in gas-tight relation to the enclosure. The heat exchanger manifold further has a flue gas outlet and a condensate outlet formed therein.

Other aspects of the heat exchanger manifold of the present invention provide for it to have one or more of 20 the following features, alone or in combination: the sealant means may be seated in the seating means about the manifold inlet openings; the heat exchanger manifold may comprise a tube sheet in which are formed the one or more manifold inlet openings; the flue gas outlet is formed above the manifold inlet openings; and the heat exchanger manifold has a condensate drain formed below the manifold inlet openings.

Yet another aspect of the heat exchanger manifold of the present invention provides that the tube sheet and the manifold cover are each comprised of the first polymer described above. The sealant means may optionally be comprised of the second polymer described above.

The present invention also provides a method for joining a condensing tube having an inlet end to a transition tube having an outlet end to form a condensing heat exchanger. The method comprises swaging one of the condensing tube inlet ends and the transition tube outlet ends to form an engagable swaged portion. The engagable swaged portion is inserted through an overhang portion of the other of the condensing tube inlet ends and the transition tube outlet ends. The overhang portion is then swaged down to engage the engagable swaged portion. Optionally, the overhang portion may be formed by swaging one of the condensing tube inlet ends and the transition tube outlet ends.

The present invention further provides an improvement for a heat exchanger comprising a primary heating section comprising a plurality of conduits having inlets for receiving hot gaseous combustion products from a burner and having outlets for discharging gaseous combustion products, and comprising a condensing section comprising a plurality of condensing conduits each having an inlet for receiving gaseous combustion products from the primary heating section, for allowing condensation of gaseous combustion products therein. The improvement comprises that each condensing conduit inlet communicates exclusively with an associated primary heat exchange conduit outlet and the condensing conduits communicate with the associated primary heat exchange section conduit outlets through swaged joints.

Other aspects of the present invention will be apparent from the following description and the appended drawings.

DETAILED DESCRIPTION OF THE INVENTION AND PREFERRED EMBODIMENTS THEREOF

Figure 1:
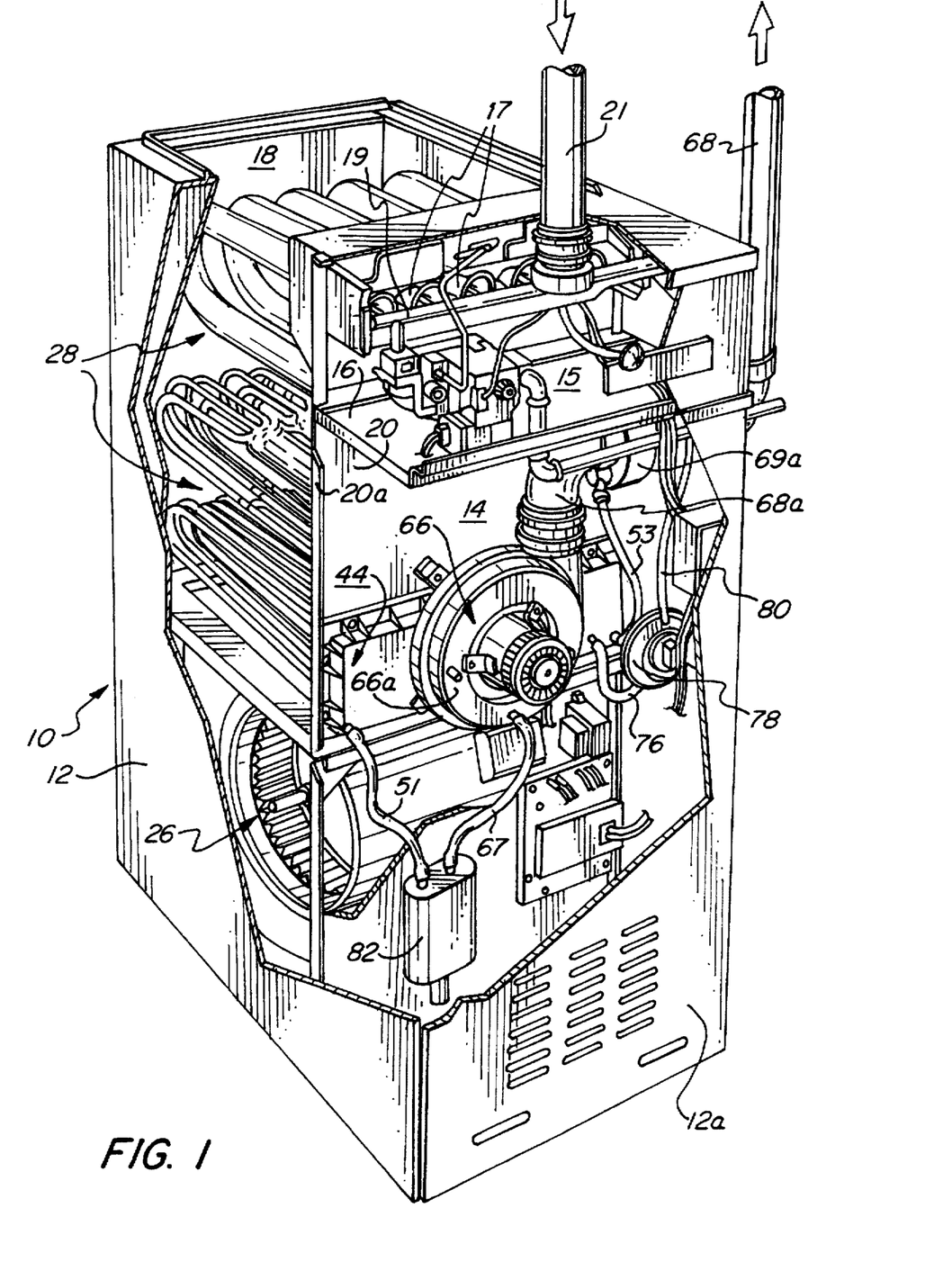
FIG. 1 is a schematic perspective view, with parts broken away, of a furnace according to one embodiment of the present invention.
Figure 2:
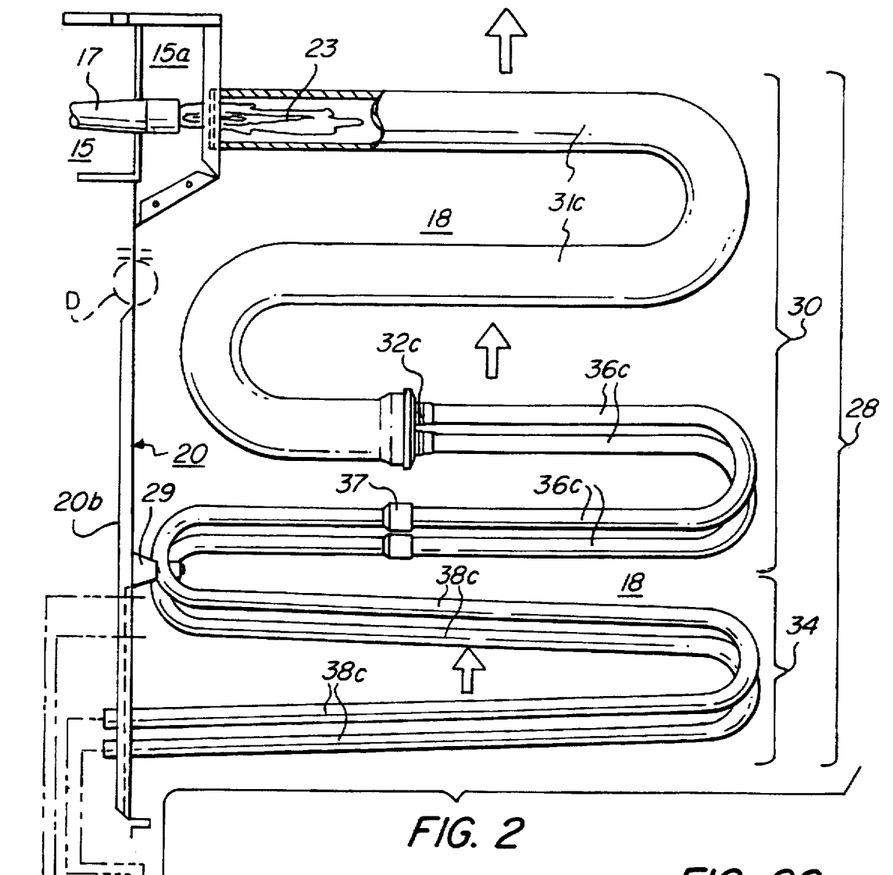
FIG. 2 is an exploded side elevation view of the heat exchanger and heat exchanger manifold of the furnace of FIG. 1.

A gas-fired, forced air furnace 10 comprising an embodiment of the present invention is shown in FIG. 1. Furnace 10 comprises an outer housing 12 having a front cover 12a which encloses a vestibule chamber 14 and a burner enclosure 15. Burner enclosure 15 is separated from vestibule chamber 14 by a panel 16, and both vestibule chamber 14 and burner enclosure 15 are separated from a heat exchange chamber 18 by a bulkhead 20. A heat exchanger 28 (FIGS. 1 and 2) is disposed within heat exchange chamber 18. As shown in FIGS. 2, 2B and 2D, bulkhead 20 comprises a sheet metal panel and has a plurality of tube openings 20c (FIG. 2C) formed therein. These tube openings are formed in bulkhead 20 in a pattern which will align them with the manifold inlet openings 58 (FIG. 4) formed in the tube sheet of the heat exchanger manifold 44, as described in detail below. Bulkhead 20 has at the opposite lateral sides thereof respective stiffening flanges 20a (FIG. 1) and 20b (FIGS. 2 and 2A, stiffening flange 20b being partly broken away in FIG. 2A for clarity of illustration), a heat exchanger side 22 and a vestibule side 24 (FIG. 2[)). A main blower 26 is positioned below heat exchange chamber 18 to force inlet air past heat exchanger 28 thence through ducting (not shown) to an area or enclosure to be heated. It will be appreciated that well-known items such as ducts, return ducts, controls, etc., which are not pertinent to explaining the present invention, have been omitted from the schematic rendition of FIG. 1 and from other Figures to enhance the clarity of illustration.

Figure 3:
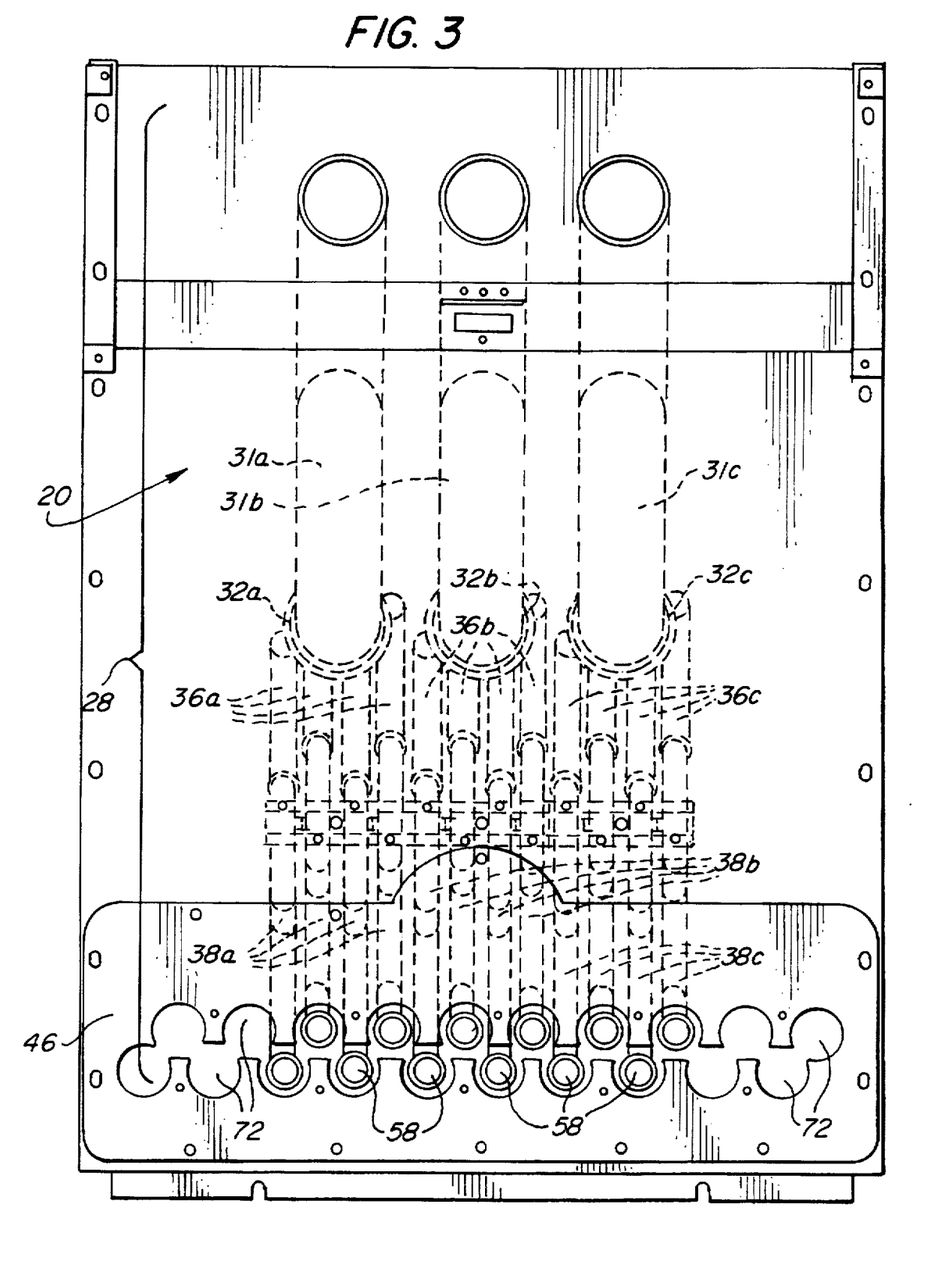
FIG. 3 is an elevation view of the manifold side of the bulkhead showing the tube sheet of the heat exchanger manifold attached thereto with the manifold cover of the heat exchanger manifold omitted.

As best seen in FIGS. 2 and 3, heat exchanger 28 comprises three identical serpentine coils, the corresponding components of which are identically numbered except for the distinguishing suffixes a, b and c. Each serpentine coil (unnumbered) comprises a respective reverse-bend, large diameter single fire tubes 31a, 31b, 31c connected by a respective transition connector 32a, 32b, 32c in fluid flow communication with a cluster of four relatively small diameter transition tubes 36a, 36b, 36c. (Each tube of a cluster of four tubes is identically numbered.) Fire tubes 31a, 31b 31c and transition tubes 36a, 36b, 36c (the first return-bend section of the smaller diameter tubes) extend through and define primary heating section 30 (FIG. 2) of heat exchanger 28. Transition tubes 36a, 36b and 36c extend to condensing section 34 (FIG. 2) of heat exchanger 28 wherein they become condensing tubes 38a, 38b, 38c and extend through condensing section 34 to and through bulkhead 20. Only the third coil, whose components bear the suffix c, is visible in FIG. 2; however, the description of the third coil of FIG. 2 applies equally to the other two coils. It should also be noted that only two of the cluster of four tubes 36c are visible in FIG. 2. Generally, it is seen that each of the three coils of which heat exchanger 28 is comprised cooperate to define as part of heat exchanger 28 (FIG. 2) a primary heating section 30 and a condensing section 34. As will be appreciated from FIGS. 2 and 3, heat exchange chamber 18 and bulkhead 20 illustrated therein are designed to accommodate a total of up to five such coils, there being room for one additional such coil on either side of the three illustrated coils. Other versions of furnace 10 are designed to contain up to seven such coils.

Figure 2A:
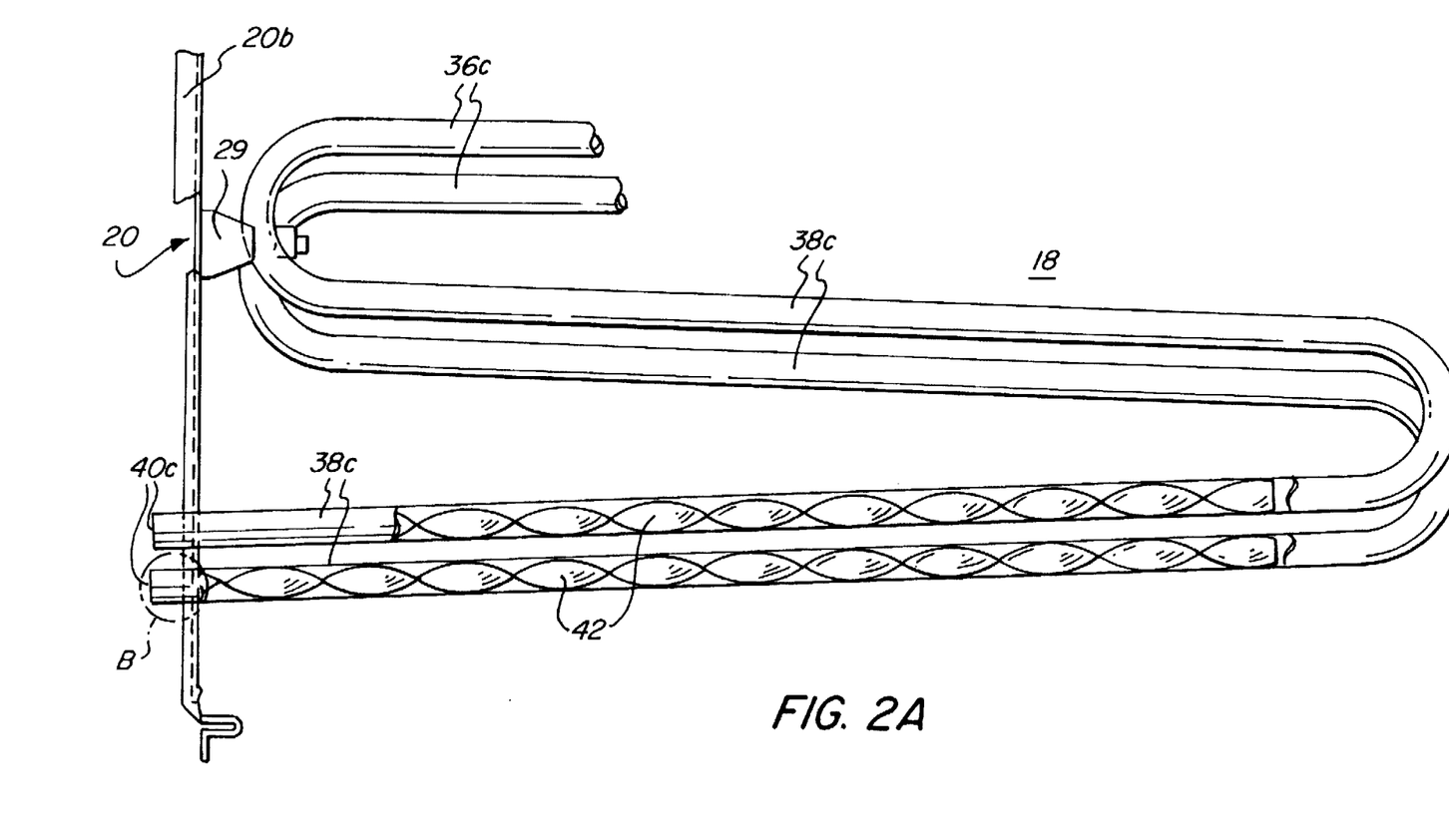
FIG. 2A is a view, enlarged with respect to FIG. 2, of the condensing section of the heat exchanger of FIG. 2.
Figures 2B, 2E, 6, 6A:
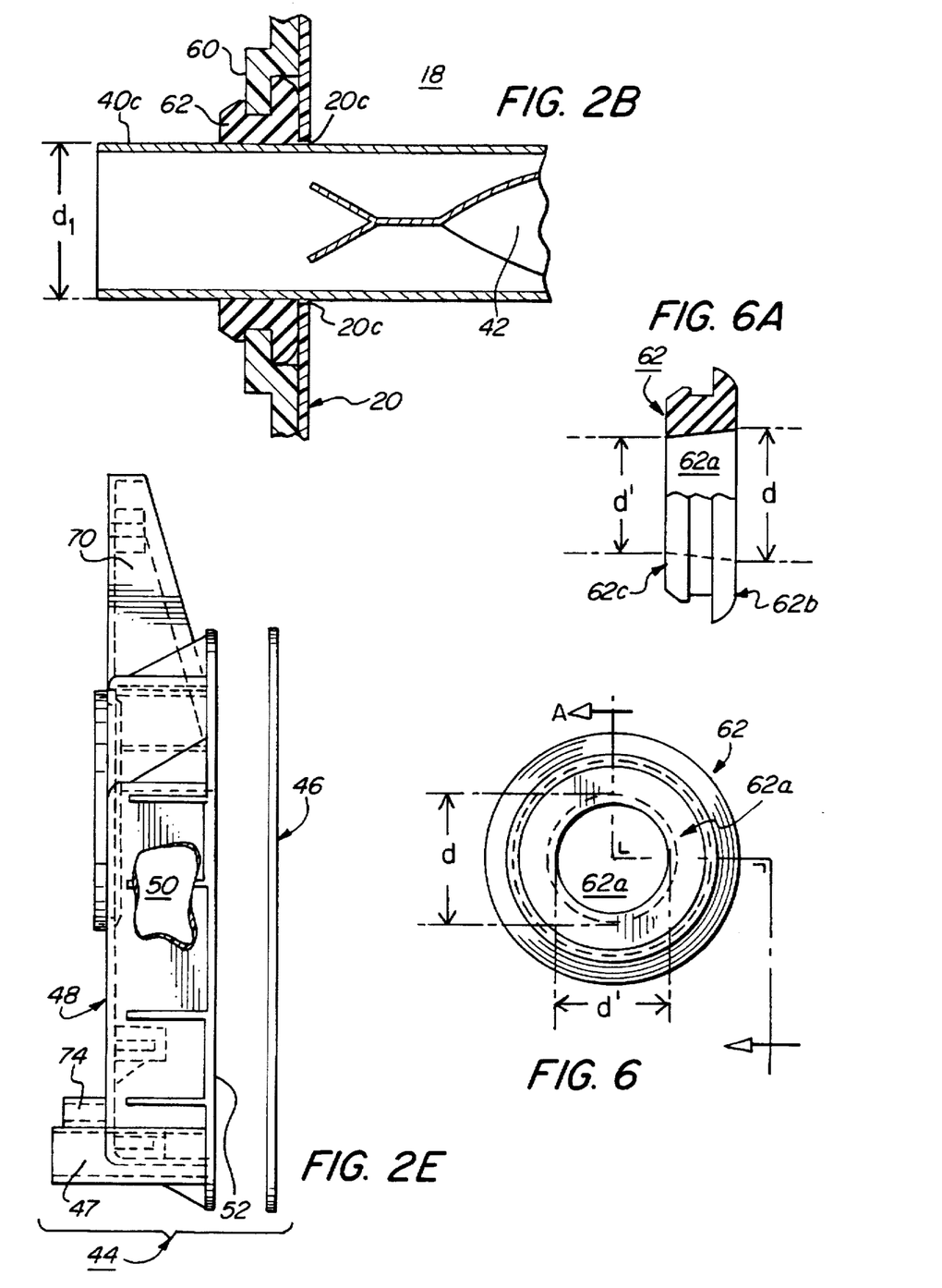
FIG. 2B is a view, greatly enlarged with respect to FIG. 2A, of the portion of FIG. 2A contained within the area B.
FIG. 2E is a view, enlarged with respect to FIG. 2, of the heat exchanger manifold of FIG. 2.
FIG. 6 is an elevation view of the interior face of a grommet comprising a sealant means for use in connection with the heat exchanger manifold of FIG. 2B.
FIG. 6A is a partial section view taken along line A—A of FIG. 6.
Figures 2C, 2D:
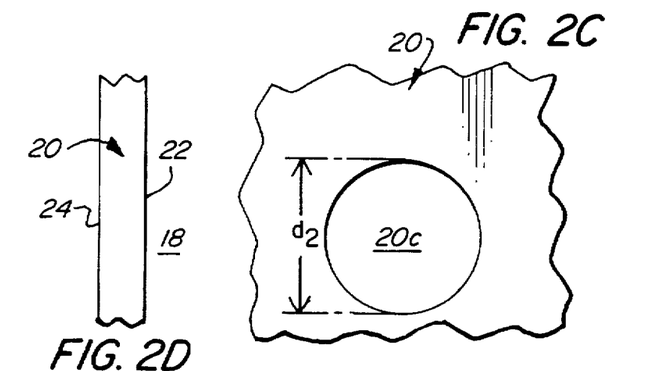
FIG. 2C is an elevation view of a broken-away segment of the bulkhead of the furnace of FIG. 1 showing a typical tube opening formed therein.
FIG. 2D is a view, greatly enlarged with respect to FIG. 2, of the portion of FIG. 2 contained within the circle D.

It will be noted that condensing tubes 38a, 38b and 38c are slanted to facilitate the drainage of liquid condensate formed therein from the condensing section 34 through the tube outlets 40c (FIG. 2A showing typical condensing tubes 38c). The condensing tubes and tube outlets of the other two coils are not visible in FIG. 2. The velocity of the gases sweeping through the condensing tubes 38a, 38b and 38c will sweep the condensate, along with the gases, into heat exchanger manifold 44 and so it is not essential, although it is preferred, that the tubes 38c be slanted downwardly as sensed moving therealong towards the heat exchanger manifold 44. The resulting gravity-assist to condensate drainage will help to off-set any slanting of the furnace away from the drainage direction which may occur due to a failure to fully compensate for unlevel floors or the like during installation.

Condensing tubes 38a, 38b and 38c are each supported by tube support members, a typical one of which, tube support member 29, is shown in FIG. 2 mounted on the heat exchanger side 22 (FIG. 2D) of bulkhead 20. Tube support member 29 clamps condensing tubes 38c at the first return-bend portion thereof both to help support heat exchanger 28 and to prevent the tube outlets, such as tube outlet 40c (FIG. 2B), from pulling out of engagement with heat exchange manifold 44 due to mechanical stresses caused by thermal expansion and contraction. Tube support member 29 may be made of any suitable material, such as a glass-filled nylon, which can well withstand the relatively low temperatures encountered in the condensing section 34 of furnace 10.

The lowermost run of condensing tube 38c is seen in FIGS. 2 and 2A to contain therein spiral twisted ribbons or "turbulators" 42 (FIG. 2A) which serve to increase the turbulence of the combustion gases flowing through tubes 38c and thereby increase the efficiency of heat exchange in the condensing section 34 with the air being forced over heat exchanger 28 by blower 26. It will be appreciated that the above description applies to all the coils of heat exchanger 28.

Since water vapor condenses in condensing tubes 38a, 38b, 38c, these tubes should be made from a material that is highly resistant to corrosion. Stainless steel, e.g., 304 stainless, 316 stainless or, preferably, AL29-4C stainless, are suitable corrosion-resistant materials for condensing tubes 38a, 38b, 38c. In contrast, transition tubes 36a, 36b and 36c may not comprise stainless steel and may comprise aluminized steel.

Figure 1A:
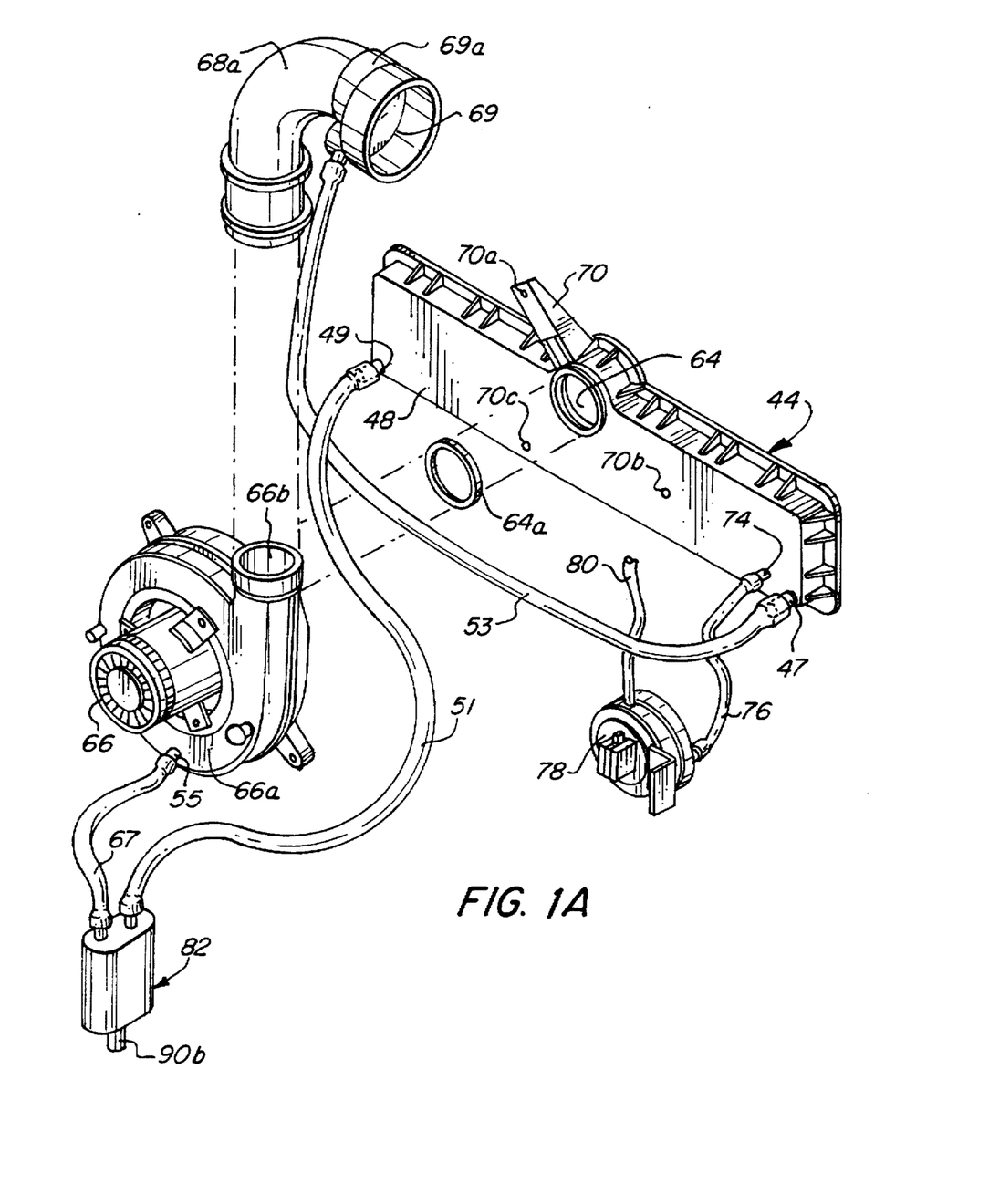
FIG. 1A is an exploded view of some components of the furnace of FIG. 1 including a heat exchanger manifold in accordance with an embodiment of the present invention.
Figures 1B, 1C, 1D, 2F:
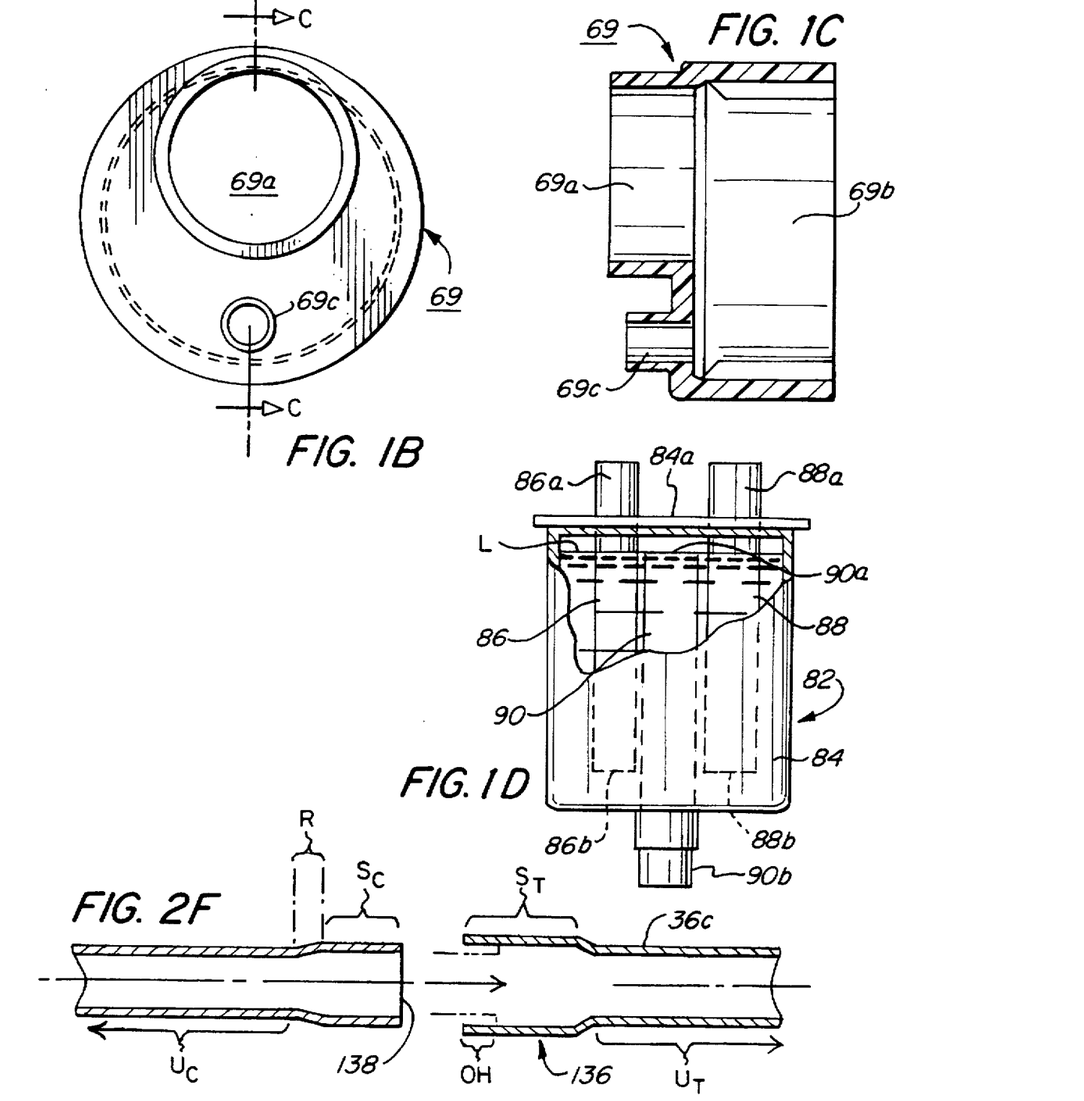
FIG. 1B is an end view in elevation of the flue outlet collector of the furnace of FIG. 1.
FIG. 1C is a section view taken along line C—C of FIG. 1B.
FIG. 1D is a view, with part broken away, of the condensate trap of the furnace of FIG. 1.
FIG. 2F is an exploded cross-sectional view of a swaged transition tube outlet end having an overhang portion and a swaged condensing tube inlet end having an engagable swaged portion, prior to the formation of a swaged joint therebetween.
Figure 2G:
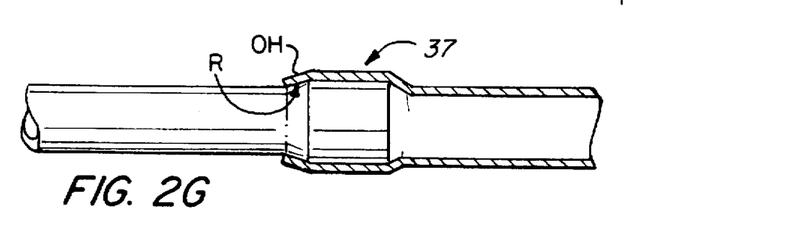
FIG. 2G is a cross-sectional view of the tube outlet and inlet of FIG. 2F in a swaged joint in accordance with one embodiment of the present invention.

The condensing tubes 38a, 38b and 38c are conveniently connected to the respective transition tubes 36a, 36b and 36c by a swaged joint that does not require welding. Generally, the joint is formed by swaging the end of one of the tubes to form an engagable swaged portion. The engagable swaged portion comprises a region that decreases in diameter as sensed moving longitudinally away from the end of the tube towards the unswaged portion, and one of the tubes to be swaged is sized to be insertable into the end of the other tube which is designated the "outer" tube. The engagable swaged portion is inserted into the outer tube to a degree such that a portion of the outer tube is concentric with, or overhangs, the region of decreasing diameter of the engagable swaged portion; this portion of the outer tube is designated the overhang portion. The joint is secured by swaging down the overhang portion to engage the engagable swaged portion therein. Thus, no intervening transition member between the inner tube and outer tube is needed. As illustrated in FIGS. 2F and 2G, the joint will be formed by inserting the inlet end of the condensing tube into the outlet end of the transition tube, but it will be understood that the reverse of such a configuration, wherein the outlet of the transition tube is inserted into the inlet of the condensing tube, also falls within the scope of this aspect of the invention.

As seen in FIG. 2, transition tubes 36c are joined to condensing tubes 38c by swaged joints 37, as is the case with transition tubes 36a, 36b and condensing tubes 38a, 38b, not seen in FIG. 2. In a typical case, the condensing tubes have an outside diameter of about 12.7 millimeters ("mm") (0.5 inches) and the transition tubes have an outside diameter of about 14.29 ram (9/16th inches). To form the joint, a portion $S_c$ (: (FIG. 2F) of the condensing tube extending about 19 mm (¾inches) from the inlet of the condensing tube is swaged out to a substantially uniform diameter that is enlarged relative to the unswaged portion of the condensing tube. The swaged transition portion R between portion $S_C$ and unswaged portion $U_C$, provides a region in which the diameter of the swaged portion decreases as sensed moving away from the inlet end 138 of the condensing tube 38c towards the unswaged portion $U_c$, making the swaged portion engagable. In some embodiments, the outer tube that receives the engagable swaged portion may be unswaged, but in the illustrated embodiment, a portion $S_T$ (FIG. 2F) of the outlet end 136 of the transition tube 36c which extends for about 25.4 mm (1 inch) from the end of the tube is swaged out to a substantially uniform diameter that is enlarged relative to the unswaged portion $U_T$ of transition tube 36c. The swaged portion $S_C$ of the condensing tube 38c is dimensioned and configured to be insertable within the swaged portion $S_T$ of the transition tube 36c, but is too large to be inserted into the unswaged portion $U_T$, as suggested in FIG. 2F and as illustrated in FIG. 2G. As stated above, portion $S_T$ is about 25.4 mm in length while portion $S_C$ is only 19 mm in length, so when condensing tube 38c is inserted into the end of transition tube 36c to the point where it must stop at unswaged portion $U_T$, the outer tube has an overhang portion OH that is concentric with the region R of decreasing diameter on the engagable swaged portion. The joint is secured by swaging down overhang portion OH of the transition tube to engage the swaged portion of the condensing tube therein, as shown in FIG. 2G. Thus, the transition tubes and the condensing tubes may be connected by a swaged joint without the need for welding, and each condensing tube or conduit inlet communicates exclusively with an associated primary heating section tube or conduit outlet. This represents a departure from conventional condensing heat exchangers in which the condensing portion conduits are connected to the primary or secondary heat exchange conduits through a common coupling box, as seen in U.S. Pat. No. 4,738,307 to Bentley.

A number of burners 17 are disposed within burner enclosure 15 and project into a burner enclosure extension 15a (FIG. 2). Burners 17 are supplied with a suitable fuel, such as natural gas, from the fuel inlet 19 (FIG. 1) and with combustion air drawn from air inlet pipe 21 (FIG. 1) through which outside air is supplied to burners 17. Combustion air can alternatively be supplied from ambient air in the area immediately adjacent to furnace 10. The use of outside combustion air is preferred if there is a possibility that the ambient air may contain solvent fumes or other corrosives-producing vapors. The fuel and combustion air provide a combustion mixture which is ignited to generate a flame 23 (FIG. 2) which is induced from burner enclosure extension 15a into the respective inlet ends of fire tubes 31a, 31b and 31c. The hot combustion products flow through tubes 31a, 31b and 31c of primary heating section 30, thence through transition connectors 32a, 32b, 32c wherein they are divided into the cluster of four smaller diameter transition tubes 36a, 36b, 36c in which the velocity of the combustion gases is increased by virtue of the smaller gas flow cross section of the smaller diameter transition tubes 36a, 36b and 36c, then through condensing tubes 38a, 38b and 38c of condensing section 34, then out of the tube outlets such as tube outlet 40c (FIG. 2B).

Heat exchanger manifold 44 (FIGS. 2 and 2E) comprises a tube sheet 46 (FIGS. 2E and 4) and a manifold cover 48 (FIGS. 2E and 5) adapted to be secured to tube sheet 46 so that tube sheet 46 and manifold cover 48 cooperate to define therebetween an enclosure 50 (FIG. 2E).

Figure 4:
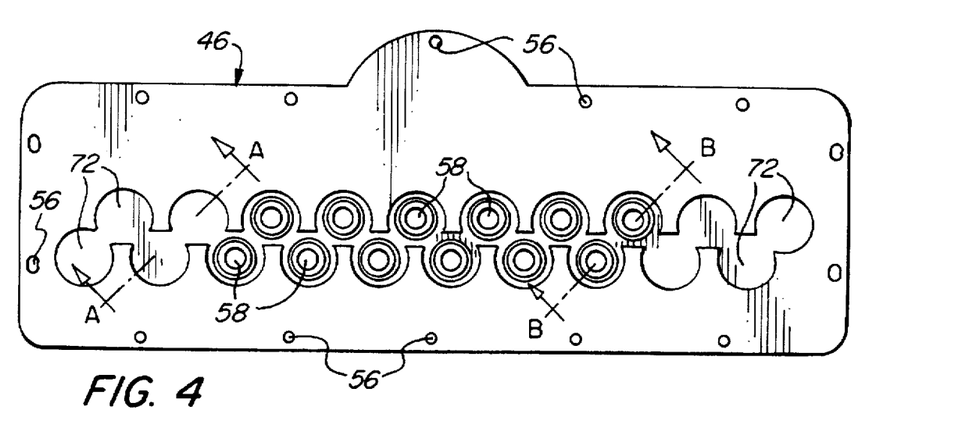
FIG. 4 is an elevation view of the interior side of the tube sheet of the heat exchanger manifold of FIG. 2E.
Figures 4A, 5:
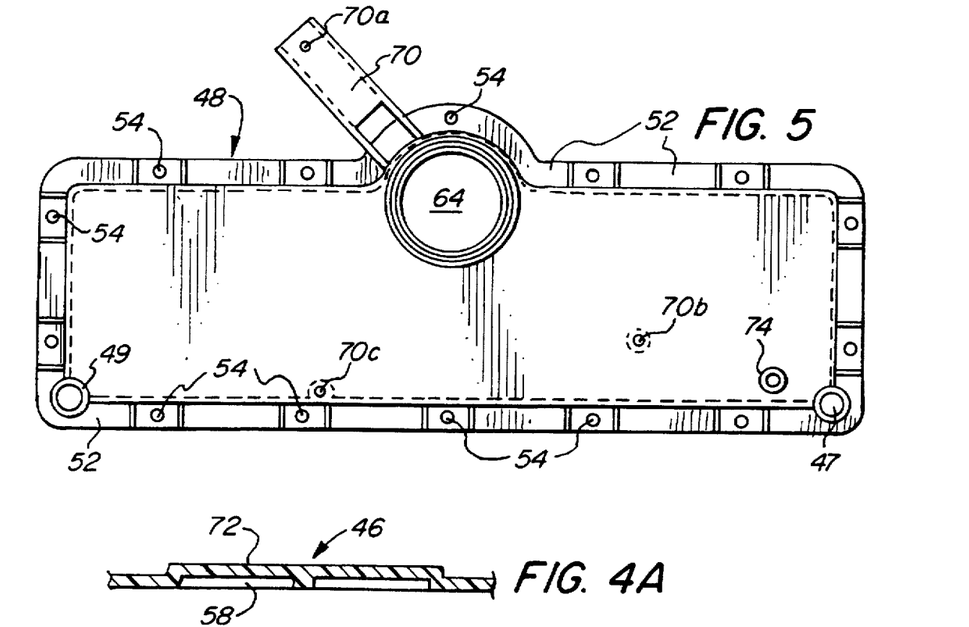
FIG. 4A is a section view taken along line A—A of FIG. 4.
FIG. 5 is an elevation view of the exterior of the manifold cover of the heat exchanger manifold of FIG. 2B.

Referring now to FIGS. 2E and 5, manifold cover 48 has a peripheral flange 52 about the periphery of which is formed a plurality of first fastener openings 54 for receiving suitable mechanical fasteners such as sheet metal screws (not shown). A suitable sealing gasket (not shown) is provided between peripheral flange 52 and the corresponding peripheral portion of tube sheet 46 which, as shown in FIG. 4, has formed about the periphery thereof a plurality of second fastener openings 56 which align with the corresponding first fastener openings 54 in order to secure tube sheet 46 to manifold cover 48 (and both to bulkhead 20 as described below) with the sealing gasket therebetween to provide a liquid- and gas-tight enclosure 50. Heat exchanger manifold 44, or at least the inner surface thereof which defines enclosure 50, is advantageously made of a suitable polymer corrosion-resistant material. Preferably, both tube sheet 46 and manifold cover 48 are comprised of a suitable polymeric material such as a thermoplastic polycarbonate. One such polymer comprises a carbonate-linked polymer produced by the reaction of bisphenol A and phosgene and is commercially available from the General Electric Company under the trademark LEXAN™. However, it will be appreciated that heat exchanger manifold 44 could be made of any suitable corrosion-resistant material, such as stainless steel.

Figure 4B:
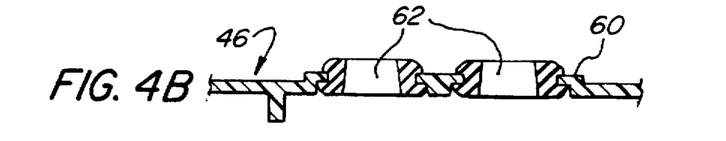
FIG. 4B is a section view taken along line B—B of FIG. 4.

Referring now to FIG. 4, tube sheet 46 contains a plurality of manifold inlet openings 58 (FIGS. 4, 4A and 4B) about the periphery of each of which is formed a sealant means seat 60 for receiving sealant means such as a grommet 62 (FIGS. 4B, 6 and 6A) therein. The grommet 62 may be made of any suitable polymer such as rubber, preferably a nitrile rubber. As seen in FIGS. 6 and 6A, the central opening 62a of grommet 62 converges in diameter as sensed moving from the exterior face 62b (the face which abuts bulkhead 20 and faces the heat exchange chamber 18) to the interior face 62c thereof. Grommet 62 thus has an exterior face inside diameter d and an interior face inside diameter d'. Preferably, the grommets 62 are not only corrosion-resistant but are resilient and flexible so that the smaller (interior face) inside diameter d' thereof (FIGS. 6 and 6A) may be made slightly smaller than the outside diameter $d_1$ (FIG. 2B) of the tube outlets of which tube outlet 40c of FIG. 2:B is typical.

Manifold cover 48 has a flue gas out-let 64 (FIG. 5) formed therein. Usually, flue gas outlet: 64 will be connected to a flue gas duct 68 provided with an inducer fan 66 (FIGS. 1 and 1A) to exhaust the combustion gases from the outlet of heat exchanger 28. Manifold cover 48 has formed therein a condensate inlet 47 and a condensate drain 49, both of which extend from manifold cover 48 as spouts (Figures 1A, 2E and 5) to which a drainage tube may be secured as described below.

Manifold cover 48 has formed thereon a support arm 70 (FIG. 5) which has a bolt hole 70a formed therein; bolt holes 70b and 70c are formed in the main body portion of manifold cover 48. An inducer fan 66 (FIGS. 1 and 1A) includes a fan shroud 66a and is mounted to manifold cover 48 by bolts (not shown) secured in bolt holes 70a, 70b and 70c with the fan inlet (not shown) received in flue gas outlet 64 (FIG. 1A). A gasket 64a (FIG. 1A) seals the fan inlet in flue gas outlet 64.

A pressure switch tap 74 (FIGS. 1A and 5) is also formed in manifold cover 48 to connect enclosure 50 thereof (FIG. 2E) via first pressure switch line 76 to differential pressure switch 78 (FIG. 1A). The other side of differential pressure switch 78 is connected by a second pressure switch line 80 to a pressure tap (not shown) located at the air entrance to burner enclosure 15. A signal is transmitted from differential pressure switch 78 to a control means (not shown). Pressure switch 78 functions in the known manner to monitor the pressure drop through heat exchanger 28 and burner enclosure 15 in order to prove the flow of combustion air to burners 17.

Inducer fan 66 has an outlet 66b (FIG. 1A) which is connected by a flue duct elbow 68a and a flue outlet 69 to flue gas duct 68 (FIG. 1), for directing the flue gases outdoors. Flue outlet 69 (Figures 1B and 1C) comprises a substantially cylindrical body having an entry opening 69a, an exit opening 69b and a condensate drain 69c. A flue outlet drainage tube 53 (Figure 1A) connects condensate drain 69c to condensate inlet 47 of heat exchanger manifold 44. As combustion gases cool in flue gas duct 68 condensation (in addition to that which takes place in condensing section 34 as described below) takes place and condensate collects within flue outlet 69 and is drained by pressure and gravity through tube 53 and via condensate inlet 47 into enclosure 50 of heat exchanger manifold 44.

A manifold drainage tube 51 (FIG. 1A) is connected to condensate drain 49 of manifold cover 48 and drains condensate collected therein to a condensate trap 82 (FIG. 1D) thence via outlet 90b to discharge. Shroud 66a has a condensate drain 55 (Figure 1A) formed at the bottom thereof and connected to condensate trap 82 by shroud drainage tube 67 to drain from shroud 66a any condensate formed therein.

Trap 82 (FIG. 1D) comprises a watertight trap body 84 within which are mounted two vertically positioned tubes 86, 88 which have respective connector ends 86a, 88a which project above cover 84a to permit connection thereto (FIG. 1A) of, respectively, shroud drainage tube 67 and manifold drainage tube 51. Condensate flowing through drainage tubes 51 and 53 emerges from the outlet ends 86b, 88b of tubes 86, 88. A vertically positioned standpipe 90 has a standpipe inlet end 90a which determines a condensate level L maintained within trap 82 so that the condensate collected within trap body 84 serves as a water seal to prevent air from being pulled into, or flue gases from escaping, via outlet 90b.

Referring now to FIG. 2A, heat exchanger manifold 44 is secured to the vestibule side 24 (FIG. 2D) of bulkhead 20 by any suitable means such as mechanical fasteners (not shown) and has grommets 62 (FIG. 2B) carried in the sealant means seats 60 which extend about the periphery of each manifold inlet opening 58 (FIG. 4). The tubes of the condensing section 34 of heat exchanger 28 pass through tube openings 20c, the diameter $d_2$ thereof (FIG. 2C) being slightly greater than the outside diameter $d_1$ (FIG. 2B) of the tube outlets exemplified by tube outlet 40c, so that the tube outlets do not directly contact the bulkhead 20 but are resiliently and sealingly received within grommets 62 carried in respective manifold inlet openings 58. The sealing means, e.g., grommets 62, may be, and preferably are, resilient and support the condensing tube outlets, e.g., tube 40c, out of contact with the bulkhead 20. (Note in FIG. 2B the small clearance between opening 20c and the tube 40c.) Generally the heat exchanger manifold 44 contains a plurality of manifold inlet openings 58 and the resilient sealant means may comprise grommets 62. The manifold inlet openings 58 have respective sealant means seats formed about the periphery thereof and the tube openings 20c of the bulkhead 20 are of larger diameter than the outer diameter of the condensing tube outlets 40c.

The smaller diameter d' (FIG. 6) of central opening 62a of grommet 62 is selected to be slightly less than the outside diameter $d_1$ of the typical tube 40c, and the central opening 62a of grommet 62 is of slanted configuration, with the larger diameter d (FIGS. 6 and 6A) thereof facing the tube such as tube 40c. This construction facilitates insertion of the tube into respective openings 62a and penetration of the tubes beyond the vestibule side 24 (FIG. 2D) of bulkhead 20 and into the enclosure 50 provided by heat exchanger manifold 44. Tube outlet 40c is seen to be supported by grommet 62 and tube sheet 46 in a liquid- and gas-tight manner and ultimately by bulkhead 20 without necessity of any direct contact between tube outlet 40c and bulkhead 20. This connection prevents leakage of combustion gases from enclosure 50 and yet obviates the necessity for a welded connection between tube outlets such as tube outlet 40c and bulkhead 20.

As shown in FIG. 4, some of the manifold inlet openings 58 are closed by closure means 72 which, when tube sheet 46 is a molded polymeric material, may conveniently be integrally formed with tube sheet 46. In some cases, in order to accommodate additional heat exchanger coils, it is desired to leave open some or all of the anifold inlet openings 58 which are closed by closure means 72 in the illustrated embodiment. In such case, an insert is simply added to the plastic injection mold in which tube sheet 46 is formed to eliminate one or more sets of the closure means 72.

In operation, when a thermostat or other control means senses that heating of the area which is heated by the furnace 10 is required, automatic controls are initiated to provide fuel, air and ignition to generate flames 23 (FIG. 2) at burners 17, and the resultant hot combustion gas products flow into heat exchanger 28 at fire tubes 31a, 31b and 31c thereof, then through transition tubes 36a, 36b and 36c to condensing tubes 38a, 38b and 38c in condensing section 34. Air supplied by blower 26 is flowed in the direction of the unnumbered arrows in FIG. 2 over the outside of heat exchanger 28 to heat the air for delivery to the area to be heated. The combustion gases flowing through condensing section 34 are cooled to a temperature low enough that liquid condensate forms therein, thereby increasing the efficiency of the furnace, and the downward pitch or slant provided to the tubes 38a, 38b and 38c facilitates the condensate flow through condensing tubes 38a, 38b and 38c and past the tube outlets such as tube outlet 40c (FIG. 2B) and into enclosure 50 of heat exchanger manifold 44. The flow of the combustion gases through heat exchanger 28, aided by inducer fan 66, exhausts the combustion gases into enclosure 50 of heat exchanger manifold 44, wherein they separate from any entrained condensate and pass outwardly through flue gas outlet 64 thence to inducer fan 66 and via flue outlet 69 to flue gas duct 68. As condensate accumulates in the bottom of heat exchanger manifold 44 it flows out through condensate drain 49 to drainage tube 51 (FIGS. 1 and 1A) via trap 82 for discharge from the furnace.

It will be appreciated that the illustrated construction rapidly drains condensate from condensing section 34 into a highly corrosion-resistant enclosure 50 for discharge from the furnace and that a gas-tight connection between the tube outlets of condensing section 34 is provided vided by corrosion-resistant sealant means such as the illustrated grommets, without necessity of a weld or any contact whatsoever between condensing tubes 38a, 38b and 38c and bulkhead 20. This lack of metal-to-metal contact between the tube outlets and bulkhead 20 obviates the necessity for welded connections therebetween, thereby reducing fabrication costs.

While the invention has been described in detail with respect to a specific preferred embodiment thereof, it will be appreciated by those skilled in the art that upon a reading and understanding of the foregoing numerous variations and other embodiments will occur which are nonetheless embraced within the spirit and scope of the appended claims or the substantial equivalent thereof.

What is claimed is:

1. In a forced air furnace comprising (a) a burner assembly, (b) a housing defining a heat exchange chamber, (c) a condensing heat exchanger disposed within the heat exchange chamber and having (i) an exchanger inlet positioned to receive hot combustion product gases from the burner assembly and (ii) a condensing section of the heat exchanger, the condensing section comprising one or more tubes terminating in one or more condensing tube outlets positioned to cause condensate to drain therefrom, (d) primary blower means to force air over the heat exchanger to be heated thereby, and (e) flue gas vent means connected in gas flow communication with the condensing tube outlets, the improvement comprising that:

the condensing tube outlets are connected in flow communication with a heat exchanger manifold having (1) condensate-receiving surfaces made of a corrosion-resistant material, (2) a flue gas outlet, (3) a condensate outlet, (4) one or more manifold inlet openings within which the condensing tube outlets are received, and (5) resilient sealant means carried in the manifold inlet openings and being disposed about and sealing the condensing tube outlets in gas-tight relation to the heat exchanger manifold.

2. The furnace of claim 1 wherein the corrosionresistant material comprises a first polymer.

3. The furnace of claim 2 wherein the heat exchanger manifold is comprised of a body defining an enclosure and the body is made of the first polymer.

4. The furnace of claim 1, claim 2 or claim 3 wherein the sealant means are comprised of a second polymer.

5. The furnace of claim 1, claim 2 or claim 3 wherein the first polymer is different from the second polymer.

6. The furnace of claim 5 wherein the first polymer comprises a thermoplastic polycarbonate.

7. The furnace of claim 6 wherein the second polymer comprises nitrile rubber.

8. The furnace of claim 1, claim 2 or claim 3 further comprising a bulkhead having one or more tube openings therein and on which the heat exchanger manifold is mounted with the one or more manifold inlet openings aligned with the one or more tube openings to admit the condensing tube outlets through the tube openings thence into the manifold inlet openings.

9. The furnace of claim 8 wherein the tube openings of the bulkhead are of larger diameter than the outer diameter of the condensing tube outlets and the resilient sealing means support the condensing tube outlets out of contact with the bulkhead.

10. The furnace of claim 8 wherein the bulkhead defines at least a portion of the heat exchange chamber.

11. The furnace of claim 1, claim 2 or claim 3 wherein the heat exchanger manifold comprises a tube sheet in which is formed a plurality of the manifold inlet openings, and a manifold cover.

12. The furnace of claim 1, claim 2 or claim 3 wherein the heat exchanger manifold contains a plurality of manifold inlet openings, the resilient sealant means comprise grommets and the manifold inlet openings have respective sealant means seats formed about the periphery thereof.

13. The furnace of claim 1, claim 2 or claim 3 further comprising an inducer fan connected in gas flow communication between the flue gas outlet of the heat exchanger manifold and the flue gas vent means.

14. The furnace of claim 13 wherein the heat exchanger manifold comprises a tube sheet in which is formed the one or more manifold inlet openings, and the flue gas outlet is formed above the manifold inlet openings.

15. A heat exchanger manifold for a forced air condensing furnace having a heat exchanger comprising a condensing section comprised of one or more tubes terminating in one or more condensing tube outlets, the heat exchanger manifold comprising a tube sheet and a manifold cover which cooperate to define therebetween an enclosure to receive flue gas and condensate from the furnace, the tube sheet and the manifold cover each being made of a corrosion-resistant polymer, the tube sheet having one or more manifold inlet openings formed therein to receive such condensing tube outlets, seating means formed about the manifold inlet openings to seat thereon resilient sealant means carried in the inlet openings to seal such condensing tubes which are, in turn, carried in the sealant means and received in the manifold inlet openings in gas-tight relation to the enclosure, the heat exchanger manifold further having a flue gas outlet and a condensate outlet formed therein.

16. The heat exchanger manifold of claim 15 wherein a plurality of manifold inlet openings are formed in the tube sheet.

17. The heat exchanger manifold of claim 15 or claim 16 wherein the tube sheet and the manifold cover are each comprised of a first polymer.

18. The heat exchanger manifold of claim 16 wherein the sealant means are comprised of a second polymer.

19. The heat exchanger manifold of claim 17 wherein the first polymer comprises a carbonate-linked thermoplastic polymer.

20. The heat exchanger manifold of claim 19 wherein the second polymer comprises a nitrile rubber.

21. The heat exchanger manifold of claim 15 or claim 16 wherein at least some of the manifold inlet openings are closed by removable closure means which may be removed to open the manifold inlet openings to accommodate entry therein of such condensing tube outlets.

22. The heat exchanger manifold of claim 21 wherein some but not all of the manifold inlet openings are closed by the removable closure means.

23. A method for joining a condensing tube having an inlet end to a transition tube having an outlet end to form a condensing heat exchanger, the method comprising:

swaging one of the condensing tube inlet ends and the transition tube outlet ends to form an engagable swaged portion;

inserting the engagable swaged portion through an overhang portion of the other of the condensing tube inlet ends and the transition tube outlet ends; and swaging down the overhang portion to engage the engagable swaged portion.

24. The method of claim 23 comprising swaging one of the inlet ends of the condensing tube and the outlet ends of the transition tube to form the overhang portion.

25. In a heat exchanger comprising a primary heating section comprising a plurality of conduits, having inlets for receiving hot gaseous combustion products from a burner and having outlets for discharging gaseous combustion products, and comprising a condensing section comprising a plurality of condensing conduits each having an inlet for receiving gaseous combustion products from the primary heating section, for allowing condensation of gaseous combustion products therein, the improvement comprising that each condensing conduit inlet communicates exclusively with an associated primary heat exchange section conduit outlet through a swaged joint between them.

* * * * *